(12) United States Patent
Yamaguchi

(10) Patent No.: US 10,954,896 B2
(45) Date of Patent: Mar. 23, 2021

(54) CANISTER

(71) Applicant: FUTABA INDUSTRIAL CO., LTD., Okazaki (JP)

(72) Inventor: Kyohei Yamaguchi, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 16/744,880

(22) Filed: Jan. 16, 2020

(65) Prior Publication Data

US 2020/0248655 A1 Aug. 6, 2020

(30) Foreign Application Priority Data

Feb. 4, 2019 (JP) .............................. JP2019-018053

(51) Int. Cl.
*F02M 25/00* (2006.01)
*F02M 25/08* (2006.01)
*B01D 53/04* (2006.01)

(52) U.S. Cl.
CPC ..... *F02M 25/0854* (2013.01); *B01D 53/0407* (2013.01); *F02M 25/089* (2013.01); *B01D 2253/102* (2013.01); *B01D 2257/702* (2013.01); *B01D 2259/4516* (2013.01)

(58) Field of Classification Search
CPC ............. F02M 25/0854; F02M 25/089; B01D 53/0407; B01D 2259/4516; B01D 2253/102; B01D 2257/702
See application file for complete search history.

(56) References Cited

U.S. PATENT DOCUMENTS 5,564,398 A * 10/1996 Maeda ............... F02M 25/0854
123/519
5,851,268 A 12/1998 Hyodo et al.
(Continued)

FOREIGN PATENT DOCUMENTS

| JP | H09228903 A | 9/1997 |
|---|---|---|
| JP | 2002235610 A | 8/2002 |
| JP | 2005016329 A | 1/2005 |

OTHER PUBLICATIONS

Notice of Reasons for Refusal for Japanese Patent Application No. 2019-018053, dated Jan. 5, 2021, 8 pages.

*Primary Examiner* — Phutthiwat Wongwian
*Assistant Examiner* — Sherman D Manley
(74) *Attorney, Agent, or Firm* — Withrow & Terranova, P.L.L.C.; Vincent K. Gustafson

(57) ABSTRACT

A canister includes a charge port, a purge port, an atmosphere port, a main chamber, a sub chamber, activated carbon, and additional activated carbon. The sub chamber communicates with the main chamber. The atmosphere port is connected to the sub chamber directly or via an additional chamber. The activated carbon is stored in a main volume (Vmain) in the main chamber. The additional activated carbon is stored in a sub volume (Vsub) in the sub chamber. A ratio of a length L in a gas flow direction to an equivalent diameter D in a section perpendicular to the gas flow direction is 2 or more for the sub chamber. A ratio of a volume of the activated carbon stored in the main chamber to a volume of the activated carbon stored in the sub chamber (Vmain/Vsub) is more than 7 and equal to or less than 10.

5 Claims, 5 Drawing Sheets

(56) References Cited

U.S. PATENT DOCUMENTS

| | | | |
|---|---|---|---|
| 7,008,470 B2* | 3/2006 | Makino | B01D 53/02 123/519 |
| 7,543,574 B2* | 6/2009 | Yamazaki | B01D 53/0415 123/519 |
| 8,156,924 B2* | 4/2012 | Hudak | F02M 25/0872 123/520 |
| 8,733,325 B2* | 5/2014 | Takamatsu | F02M 25/08 123/519 |
| 8,814,987 B2* | 8/2014 | Tschantz | F02M 25/0854 95/146 |
| 8,992,673 B2* | 3/2015 | Mani | B01D 53/04 96/132 |
| 9,482,190 B2* | 11/2016 | Makino | F02M 25/0854 |
| 9,534,566 B2* | 1/2017 | Danielowski | B60K 15/03504 |
| 10,184,431 B2* | 1/2019 | Kosugi | F02M 25/089 |
| 2001/0039881 A1* | 11/2001 | Moriyama | B01D 53/0415 96/139 |
| 2002/0174857 A1* | 11/2002 | Reddy | F02M 25/0854 123/520 |
| 2004/0055468 A1* | 3/2004 | Makino | F02M 25/08 96/131 |
| 2004/0261777 A1* | 12/2004 | Ogawa | F02M 25/0854 123/698 |
| 2005/0204924 A1* | 9/2005 | Nakamura | B01D 53/0431 96/147 |
| 2007/0119306 A1* | 5/2007 | Yamada | F02M 25/0854 96/131 |
| 2008/0302245 A1* | 12/2008 | Yoshida | B01D 53/0415 96/146 |
| 2009/0013973 A1* | 1/2009 | Yamasaki | F02M 25/0854 123/519 |
| 2010/0180870 A1* | 7/2010 | Kosugi | F02M 25/0854 123/519 |
| 2011/0315126 A1* | 12/2011 | Yoshida | F02M 25/0854 123/519 |
| 2012/0186563 A1* | 7/2012 | Hasegawa | B01D 53/0415 123/519 |
| 2012/0304865 A1* | 12/2012 | Sugiura | B01D 53/0446 96/131 |
| 2013/0284154 A1* | 10/2013 | Makino | F02M 25/0854 123/519 |
| 2014/0124385 A1* | 5/2014 | Yamasaki | B01J 20/28042 206/0.7 |
| 2014/0165843 A1* | 6/2014 | Omichi | B01D 53/0415 96/144 |
| 2014/0352542 A1* | 12/2014 | Mani | F02M 25/0854 96/154 |
| 2015/0007799 A1* | 1/2015 | Takeshita | B01D 53/0407 123/519 |
| 2017/0002770 A1* | 1/2017 | Kosugi | B01D 53/0407 |
| 2017/0002771 A1* | 1/2017 | Kosugi | B01D 53/0407 |
| 2018/0363594 A1* | 12/2018 | Byrne | B01D 53/0415 |
| 2019/0186426 A1* | 6/2019 | Nakagawa | B01D 53/0415 |

* cited by examiner

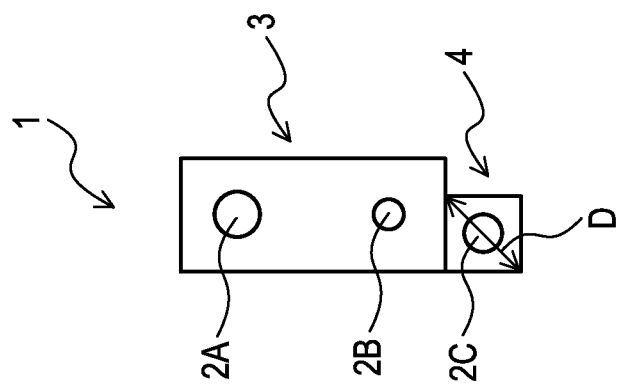
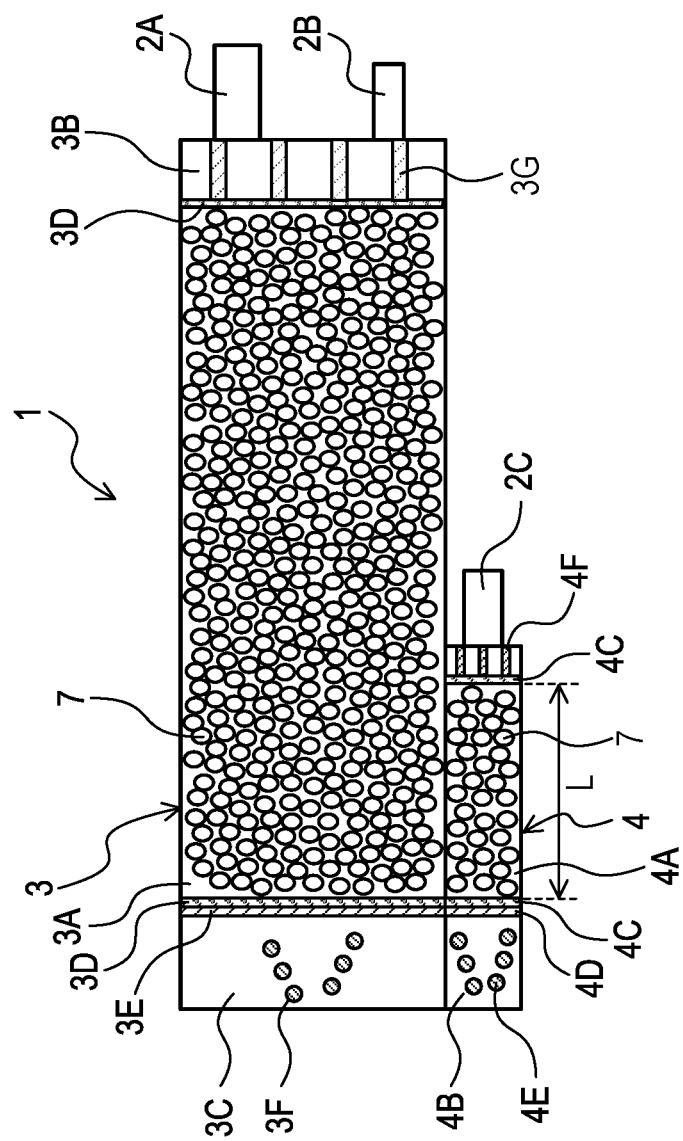
FIG. 1A
FIG. 1B

CANISTER

CROSS-REFERENCE TO RELATED APPLICATIONS

The present application claims the benefit of Japanese Patent Application No. 2019-018053 filed on Feb. 4, 2019 with the Japan Patent Office, the entire disclosure of which is incorporated herein by reference.

BACKGROUND

The present disclosure relates to a canister.

A canister, which inhibits release of evaporated fuel to the atmosphere, is attached to a fuel tank of a vehicle. The canister absorbs the evaporated fuel to activated carbon, desorbs fuel from the activated carbon with aspirated air for purging, and supplies the purged fuel to an engine.

Generally, the canister at least includes a main chamber to which a charge port is connected, and a sub chamber connected to the main chamber. Each of the main chamber and the sub chamber stores activated carbon. Also, in order to adjust absorption efficiency, a ratio (L/D) of a length L in a gas flow direction to an equivalent diameter D in a section perpendicular to the gas flow direction is designed appropriately for each chamber (see Japanese Unexamined Patent Application Publication No. 2005-16329).

SUMMARY

In recent years, an engine capacity is decreasing due to hybridization, downsizing, etc., and a purge volume for a canister is also decreasing. When the purge volume decreases, desorption of evaporated fuel from activated carbon by purging becomes insufficient in a sub chamber which is closer to an atmosphere port than a main chamber, and the evaporated fuel remaining in the sub chamber may be later discharged from the atmosphere port. Also, if butane filled into the canister remains in the sub chamber after purging, the butane will be released to the atmosphere.

The present inventors found and disclosed that, by appropriately adjusting respective volumes of the activated carbon in the sub chamber and the main chamber, while keeping the L/D of the sub chamber to a certain level or more, it is possible to limit release of the evaporated fuel and the like via the atmosphere port without deterioration in absorption and desorption performance of the evaporated fuel.

In one aspect of the present disclosure, it is preferable to provide a canister that can limit release of absorbed substances from an atmosphere port.

One aspect of the present disclosure provides a canister. The canister comprises a charge port, a purge port, an atmosphere port, a main chamber, a sub chamber, activated carbon, and additional activated carbon. The charge port is configured to take in an evaporated fuel. The purge port is configured to discharge the evaporated fuel. The atmosphere port is open to atmosphere. The charge port and the purge port are connected to the main chamber. The sub chamber communicates with the main chamber. The atmosphere port is connected to the sub chamber directly or via an additional chamber. The activated carbon is stored in a main volume (Vmain) in the main chamber. The additional activated carbon is stored in a sub volume (Vsub) in the sub chamber.

In the sub chamber, a ratio L/D of a length L in a gas flow direction to an equivalent diameter D in a section perpendicular to the gas flow direction is 2 or more. A ratio of the main volume to the sub volume (Vmain/Vsub) is more than 7 and equal to or less than 10.

According to the configurations as above, by setting the volume ratio of the activated carbon stored in the main chamber to the activated carbon stored in the sub chamber in a certain range, it is possible to reduce residual amount of absorbed substances in the sub chamber after purging, while limiting an increase in pressure loss. As a result, release of the absorbed substances from the atmosphere port can be limited. In addition, by setting the L/D in the sub chamber to 2 or more, more gas comes into contact with the absorbed substances in the sub chamber. Thus, it is possible to maintain absorption and desorption efficiency in the sub chamber, while reducing a capacity (volume holding activated carbon) of the sub chamber.

In one aspect of the present disclosure, a ratio of a volume of purge air (Vpurge) to the volume of the activated carbon stored in the sub chamber (Vsub) may be 600 or more. According to such configuration, desorption of the absorbed substances, such as the evaporated fuel, in the sub chamber by purging is enhanced. Therefore, release of the absorbed substances from the atmosphere port can be more reliably limited.

It should be noted that the "equivalent diameter D in the section perpendicular to the gas flow direction" in the sub chamber means a value obtained by, for example, averaging a diameter ($D=(S/\pi)^{1/2} \times 2$) of a perfect circle having the same area as a section S, which is a section perpendicular to the gas flow direction in the sub chamber, along the gas flow direction in the sub chamber.

BRIEF DESCRIPTION OF THE DRAWINGS

Some example embodiments of the present disclosure will be described hereinafter with reference to the accompanying drawings, in which:

FIG. 1A is a schematic sectional view of a canister according to an embodiment;

FIG. 1B is a schematic side view of the canister in FIG. 1A;

DETAILED DESCRIPTION OF EXEMPLARY EMBODIMENTS

1. First Embodiment

1-1. Configuration

Figure 2:
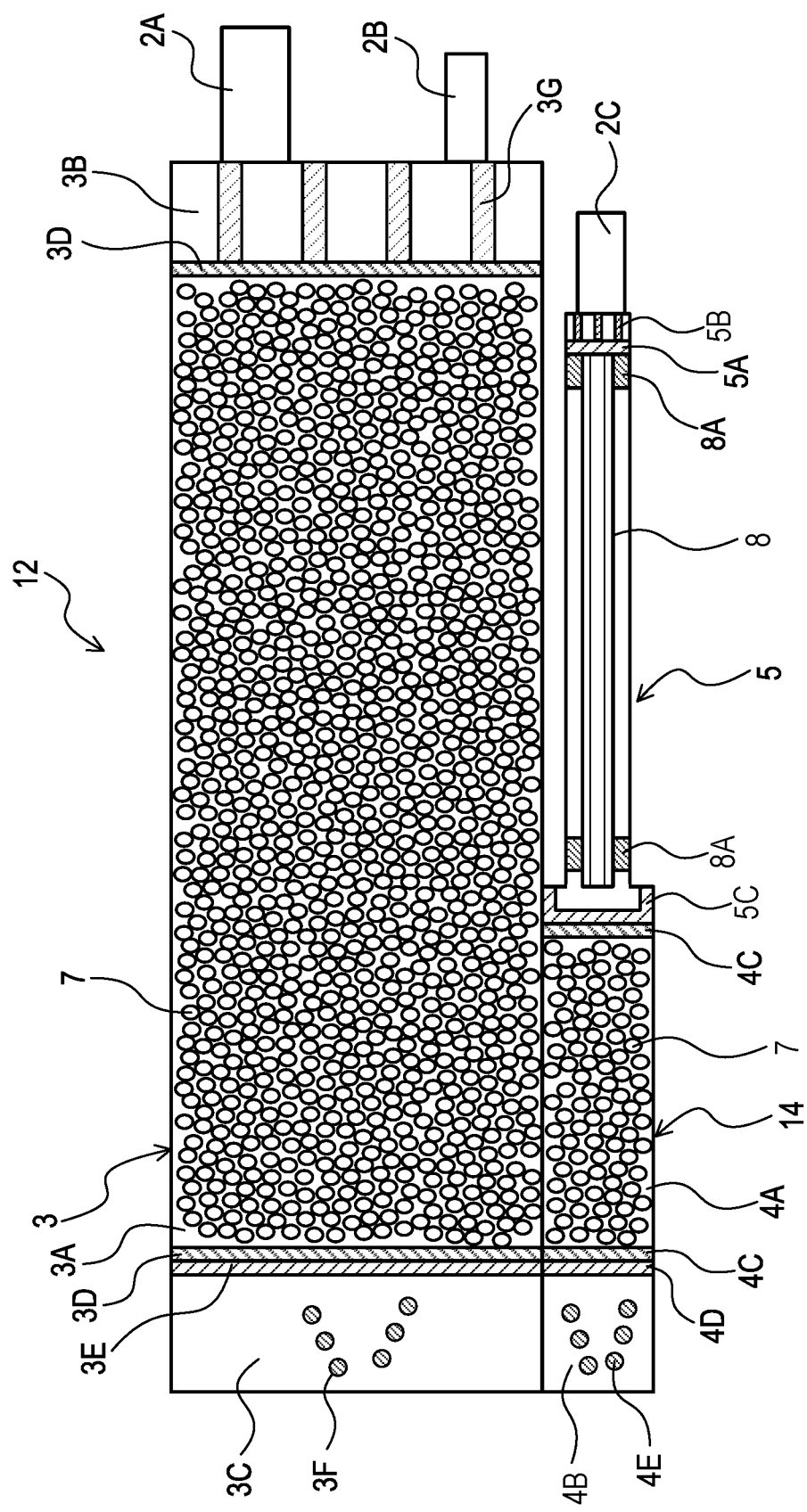
FIG. 2 is a schematic sectional view of a canister according to an embodiment different from the embodiment in FIG. 1A.

A canister 1 shown in FIG. 1A absorbs and desorbs evaporated fuel generated in a fuel tank of a vehicle. The term "absorb" is used broadly in this specification and claims, and is hereby defined to include adsorption. The canister 1 comprises a charge port 2A, a purge port 2B, an atmosphere port 2C, a main chamber 3, a sub chamber 4, and activated carbon 7.

<Port>

The charge port 2A is connected to the fuel tank of the vehicle via piping. The charge port 2A is configured to pass the evaporated fuel generated in the fuel tank into the canister 1.

The purge port 2B is connected to an intake pipe of an engine of the vehicle via a one-way purge valve (not shown). The purge port 2B is configured to discharge the evaporated fuel inside the canister 1 from the canister 1 and supply the evaporated fuel to the engine.

The atmosphere port 2C is connected to a filling port of the vehicle via piping, and is open (through the filling port) to the atmosphere. The atmosphere port 2C releases gas, from which the evaporated fuel has been removed, to the atmosphere. Also, the atmosphere port 2C takes in external air (that is, purge air) to desorb (that is, purge) the evaporated fuel absorbed by the canister 1.

<Main Chamber>

The main chamber 3 stores the activated carbon 7, and absorbs the evaporated fuel received from the charge port 2A. Also, the main chamber 3 discharges the absorbed evaporated fuel through the purge port 2B.

As shown in FIG. 1A, the main chamber 3 is partitioned by filters 3D into a first space 3A, a second space 3B, and a third space 3C. The filters 3D are configured to retain the activated carbon 7 but to allow passage of gas.

The first space 3A is arranged so as to be interposed between the second space 3B and the third space 3C. The first space 3A is filled with the activated carbon 7. The first space 3A has a larger volume than the second space 3B and the third space 3C.

The second space 3B is adjacent to the first space 3A. The charge port 2A and the purge port 2B are connected to the second space 3B. The second space 3B is not filled with the activated carbon 7. In addition, ribs 3G extending from a housing to press the filter 3D are arranged in the second space 3B.

The third space 3C is arranged on an opposite side of the second space 3B relative to the first space 3A. The third space 3C communicates with a later-described second space 4B of the sub chamber 4. The third space 3C is not filled with the activated carbon 7. In addition, a resin plate 3E having at least one through hole, and a spring 3F that presses the resin plate 3E and the filter 3D toward the first space 3A are arranged in the third space 3C.

<Sub Chamber>

The sub chamber 4 stores the activated carbon 7, and communicates with the main chamber 3 so that gas can be freely circulated between the main chamber 3 and the sub chamber 4. The sub chamber 4, as shown in FIG. 1A, is partitioned into a first space 4A and the second space 4B by a filter 4C. The filter 4C is similar to the filter 3D of the main chamber 3.

The first space 4A is filled with the activated carbon 7. Also, the atmosphere port 2C is connected to the first space 4A. Another filter 4C and ribs 4F (which extend from the housing and press the filter 4C) are arranged between the first space 4A and the atmosphere port 2C. A resin plate may be arranged between the first space 4A and the atmosphere port 2C (not shown in FIG. 1A, shown as 4C in FIG. 2).

The second space 4B is adjacent to the first space 4A. The third space 3C of the main chamber 3 is connected to the second space 4B. The second space 4B is not filled with the activated carbon 7. In addition, a resin plate 4D having a through hole, and a spring 4E that presses the resin plate 4D and the filter 4C toward the first space 4A are arranged in the second space 4B.

The sub chamber 4 is not connected to the main chamber 3 in any portion other than the second space 4B. In other words, the main chamber 3 and the sub chamber 4 are connected only by a flow path inside of the third space 3C and the second space 4B.

The evaporated fuel taken in from the charge port 2A passes the second space 3B of the main chamber 3, and is absorbed by the activated carbon 7 in the first space 3A. If the engine is not on, then evaporated fuel which cannot be absorbed in the first space 3A passes the third space 3C to the sub chamber 4, and is absorbed by the activated carbon 7 in the first space 4A of the sub chamber 4. Gas, from which the evaporated fuel has been absorbed, is released from the atmosphere port 2C.

By supplying air from the atmosphere port 2C during a purge cycle (while the engine is running), the evaporated fuel absorbed by the activated carbon 7 in the first space 4A of the sub chamber 4, together with the evaporated fuel absorbed by the activated carbon 7 in the first space 3A of the main chamber 3, are discharged from the purge port 2B to the engine. As a result, air including the evaporated fuel (that was temporarily absorbed by carbon) is supplied to the engine.

In the sub chamber 4, no protrusion protruding from an inner wall of the sub chamber 4 (for example, a rod member extending from the resin plate 4D or the filter 4C in a gas flow direction) is arranged. In other words, the activated carbon 7 in the first space 4A of the sub chamber 4 has even density, with no variation in density.

<L/D, "Length to Diameter Ratio" of First Space in Sub Chamber>

In the first space 4A filled with the activated carbon 7 in the sub chamber 4, a ratio L/D of a length L [mm] in a gas flow direction to an equivalent diameter D [mm] in a section perpendicular to the gas flow direction (see FIG. 1B) is 2 or more. In case that the L/D is less than 2, a sectional area of the activated carbon increases, and it becomes difficult for the gas to flow radially outward of the atmosphere port 2C. As a result, portions of the activated carbon 7 in the first space 4A do not effectively contact the flowing gas. In other words, absorption efficiency of the canister 1 is significantly reduced. It is preferable that the L/D is 2.5 or more, and even more preferably 3.0 or more.

<Vmain/Vsub, Activated Carbon Volume Ratio>

A ratio (hereinafter, "activated carbon volume ratio") of a volume of the activated carbon 7 stored in the main chamber 3 (that is, volume of the first space 3A, also known as Vmain) to a volume of the activated carbon 7 stored in the sub chamber 4 (that is, volume of the first space 4A, also known as Vsub) is more than 7 and equal to or less than 10. The activated carbon volume ratio is preferably 10.

If the activated carbon volume ratio is 7 or less, then there is a possibility that a desorption property of the evaporated fuel in the sub chamber 4, that is, diurnal breathing loss (DBL) performance, may decrease. To the contrary, in case that the activated carbon volume ratio exceeds 10, there is a possibility that pressure loss may become too large due to increase in ventilation resistance of the canister 1.

<BV=Vpurge/Vsub=Volume of Purge Air Divided by Volume of First Space>

A ratio of a volume of the purge air to the volume of the activated carbon 7 stored in the sub chamber 4 (hereinafter, "BV") is preferably 600 or more. Thus, Vpurge/Vsub≥600.

In case that the BV is less than 600, there is a possibility that desorption of the evaporated fuel and butane may be insufficient during the purge cycle, and the evaporated fuel and butane may later be easily released from the atmosphere port 2C. For example, in case that the volume of the purge air is 200 L, and the volume of the activated carbon 7 in the sub chamber 4 is 0.3 L, the BV becomes 667 times. It is more preferable that the BV is 650 times or more, and further preferably 700 times or more.

<Activated Carbon>

The activated carbon 7 absorbs the evaporated fuel supplied to the canister 1 together with air and the like, and butane. Also, the activated carbon 7 introduces external air to desorb the evaporated fuel and butane. The desorbed evaporated fuel is supplied to the engine.

Well-known types of activated carbon may be used as a stock of the activated carbon 7. In the present embodiment, an aggregate of granular activated carbon is used as the activated carbon 7. The activated carbon 7 stored in the main chamber 3, and the activated carbon 7 stored in the sub chamber 4 may be of the same kind or different kinds.

1-2. Effect

According to the embodiment described in detail above, the following effects can be achieved.

(1a) The activated carbon volume ratio (Vmain/Vsub) is set to more than 7 and equal to or less than 10. Thus, while limiting an increase in pressure loss due to decrease in flow path sectional area of the sub chamber 4, residual amount of absorbed substances in the sub chamber 4 can be reduced earlier with a less purge amount. As a result, release of absorbed substances from the atmosphere port 2C can be limited. Also, the L/D of the sub chamber 4 is set to 2 or more. Thus, more gas contacts the absorbed substance in the sub chamber 4, and it is possible to maintain absorption and desorption efficiency in the sub chamber 4 while reducing the capacity of the sub chamber 4.

2. Second Embodiment

2-1. Configuration

A canister 12 shown in FIG. 2 absorbs and desorbs evaporated fuel generated in a fuel tank. The canister 12 comprises the charge port 2A, the purge port 2B, the atmosphere port 2C, the main chamber 3, a sub chamber 14, a third chamber 5, and activated carbon 7, 8.

The charge port 2A, the purge port 2B, the atmosphere port 2C, the main chamber 3, and the activated carbon 7 of the canister 12 are the same as those of the canister 1 of FIG. 1A. Therefore, the same reference numbers are given to those components, and the description thereof is not repeated.

<Sub Chamber>

The sub chamber 14 is the same as the sub chamber 4 of FIG. 1A, except that the third chamber 5 is inserted between the first space 4A and the atmosphere port 2C.

<Third Chamber>

The third chamber 5 stores the activated carbon 8 (in a honeycombed shape), and communicates with the sub chamber 14 so that gas can flow freely between the sub chamber 14 and the third chamber 5. A volume (Vhoney) of the activated carbon 8 stored in the third chamber 5 is smaller than that of the activated carbon 7 stored in the sub chamber 14.

The third chamber 5 is connected to the first space 4A of the sub chamber 14. Also, the atmosphere port 2C is connected to the third chamber 5 at a position opposite to a portion connected to the sub chamber 14. In other words, the third chamber 5 of the present embodiment is arranged between the sub chamber 4 and the atmosphere port 2C of the canister 1 shown in FIG. 1A.

The third chamber 5 stores so-called honeycomb shaped molded activated carbon, which is formed into a tubular shape and has through holes therein, as the activated carbon 8. The molded activated carbon is obtained by extruding a material, including carbon mixed with ceramic as a binder, into a certain shape.

The activated carbon 8 is arranged inside the third chamber 5 so that central axes of the through holes follow the bulk gas flow direction. In other words, the through holes of the activated carbon 8 are configured so that gas can easily pass in a direction of the central axes. When gas containing the evaporated fuel passes through the through holes of the activated carbon 8, the evaporated fuel is absorbed by the activated carbon 8.

The activated carbon 8 is optionally arranged inside the third chamber 5 by holders 8A. The holders 8A are configured by a filter or rubber, for example. A filter 5A, and ribs 5B (which extend from a housing and press the filter 5A) are arranged between the third chamber 5 and the atmosphere port 2C. Also, a resin plate 5C is arranged between the third chamber (honey chamber) 5 and the sub chamber 14.

Shapes of the through holes of the molded activated carbon are not specifically limited. Therefore, the through holes may have a shape including a curve, other than a polygon such as a quadrangle or a hexagon. An example of the through holes including a curve is formed by arranging corrugated sheets one by one between flat sheets arranged in parallel.

2-2. Effect

According to the embodiment described in detail above, the following effect can be achieved.

(2a) The third chamber 5 (honey chamber) provides absorption of the evaporated fuel from the sub chamber 14. As a result, it is possible to more reliably limit release of absorbed substances from the atmosphere port 2C.

3. Other Embodiments

Although the embodiments of the present disclosure have been described above, the present disclosure is not limited to the embodiments described above, but may take various forms.

Figure 3:
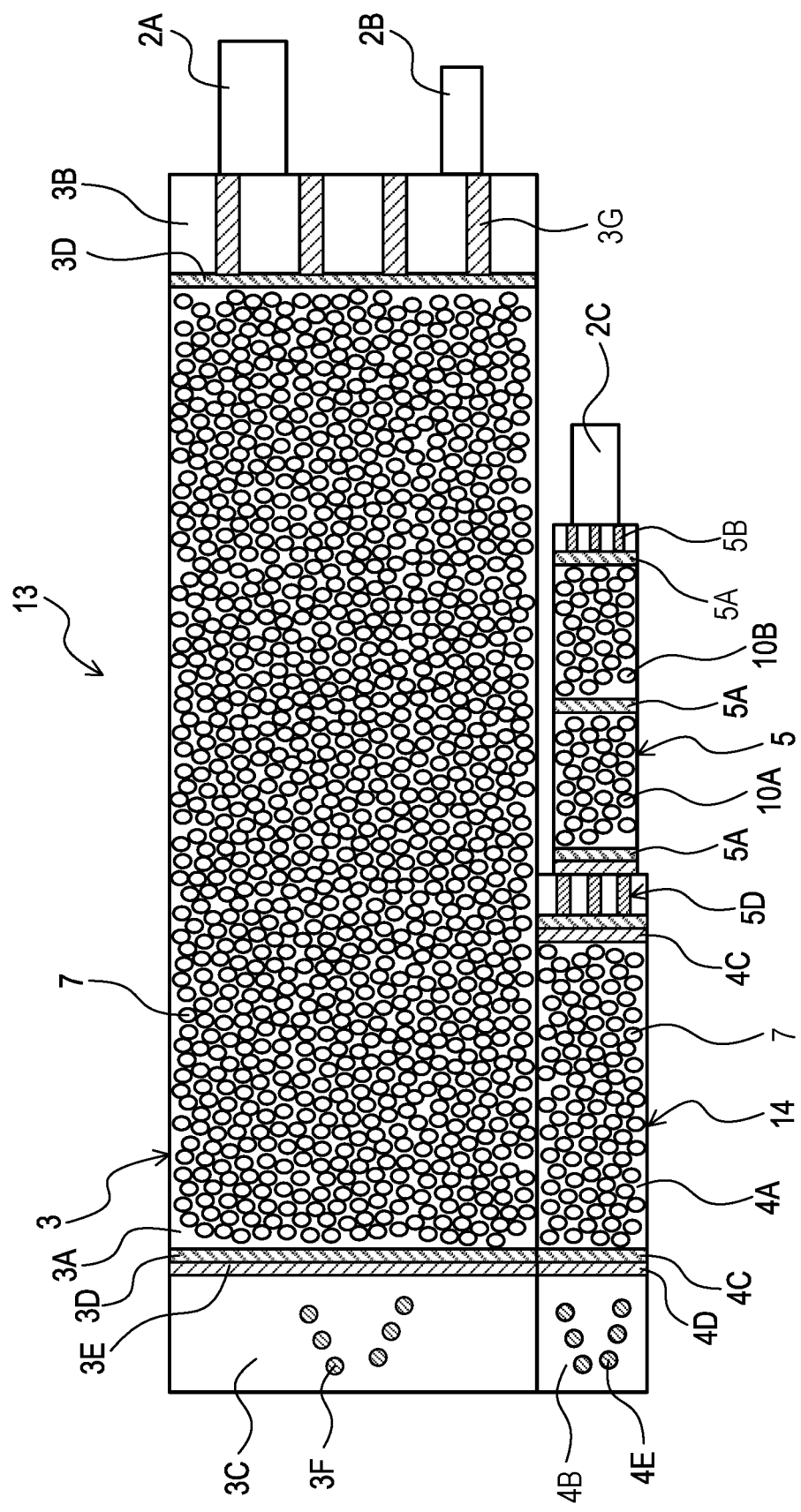
FIG. 3 is a schematic sectional view of a canister according to an embodiment different from the embodiments in FIGS. 1A and 2.

(3a) In the canister 12 of the above-described embodiment, the activated carbon 8 stored in the third chamber 5 is not limited to a honeycomb shaped molded activated carbon. Also, as in a canister 13 shown in FIG. 3, two types of activated carbon 10A, 10B may be arranged inside the third chamber 5 in a manner divided into upstream and downstream portions of a gas flow path. In FIG. 3, the third chamber 5 is partitioned by the filters 5A. In addition, a resin grid 5D is arranged between the third chamber 5 and the sub chamber 14.

In the canister 13 of FIG. 3, a second activated carbon 10B is stored in an area of the third chamber 5 closer to the atmosphere port 2C, and a first activated carbon 10A is stored in an area of the third chamber 5 closer to the sub chamber 14. The first activated carbon 10A has a higher absorption capacity than the second activated carbon 10B.

The first activated carbon 10A and the second activated carbon 10B arranged as such can reliably limit leaking of the evaporated fuel and the like from the sub chamber 14 to the atmosphere port 2C.

(3b) A function performed by a single element in the above-described embodiments may be achieved by a plurality of elements, or a plurality of functions performed by a single element may be achieved by a plurality of elements. Also, a part of a configuration in the above-described embodiments may be omitted. Further, at least a part of a configuration in the above-described embodiments may be added to, or may replace, another configuration in the above-described embodiments. Any form included in the technical idea defined only by the language of the claims may be an embodiment of the present disclosure.

4. Example

Hereinafter, experiments conducted to confirm the effect of the present disclosure, and their evaluations, will be described.

Figure 4A:
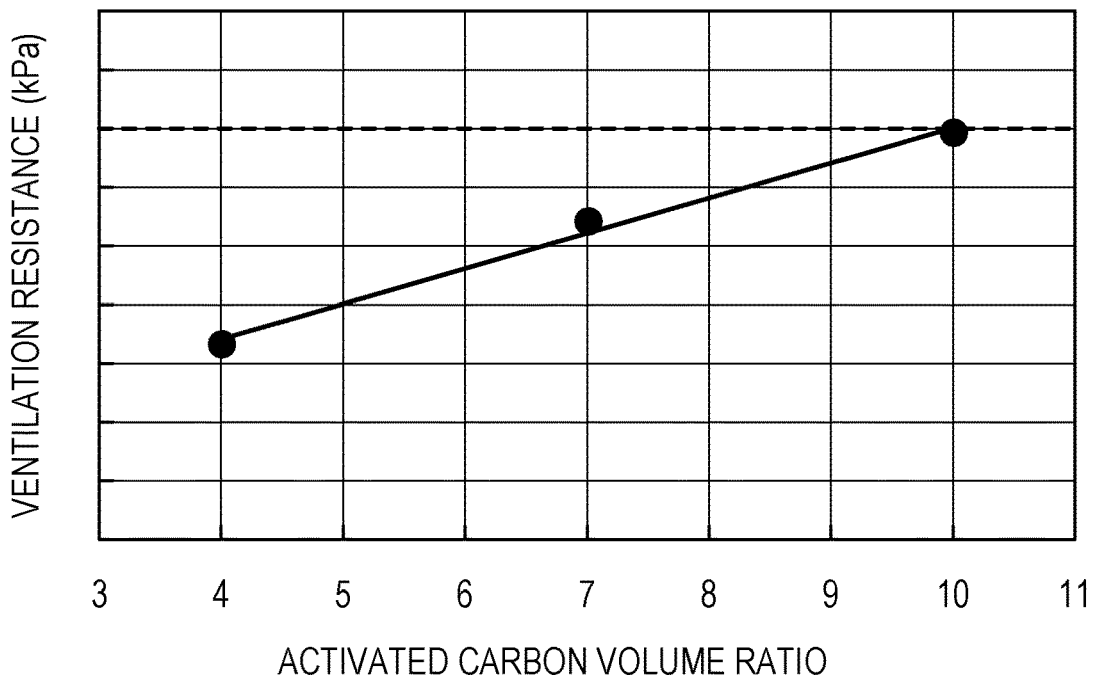
FIG. 4A is a graph showing a relationship between a volume ratio of activated carbon between a sub chamber and a main chamber, and a ventilation resistance in an example.

A graph in FIG. 4A shows changes in ventilation resistance at a ventilation volume of 50 L/min when the activated carbon volume ratio in the sub chamber 14 of the canisters 12 and 13 in FIG. 2 and FIG. 3 is changed. A dashed line in FIG. 4A shows a ventilation resistance 2 kPa required for refueling performance of a vehicle.

As shown in FIG. 4A, in the canisters 12 and 13, the ventilation resistance can be 2 kPa or less by setting the activated carbon volume ratio to 10 or less. However, this ventilation resistance is merely an example.

Figure 4B:
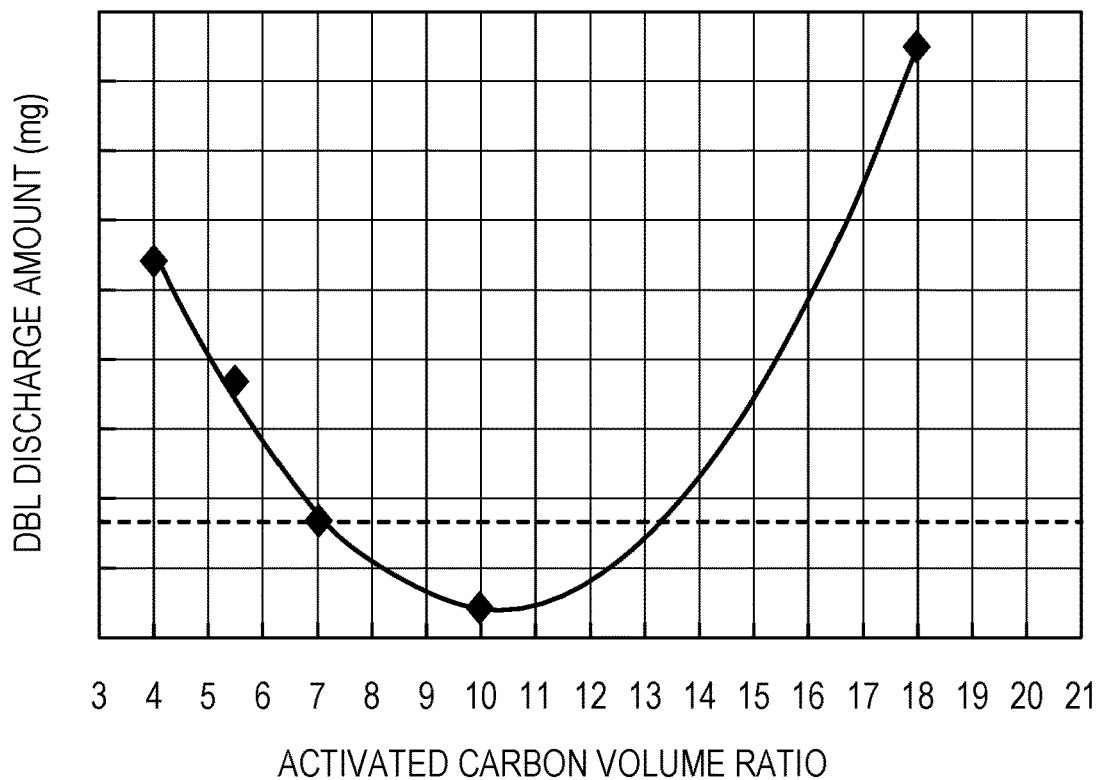
FIG. 4B is a graph showing a relationship between a volume ratio of activated carbon in the sub chamber and the main chamber, and a discharge amount in a DBL test in the example.

A graph in FIG. 4B shows changes in discharge amount (that is, released amount of butane after purging) in a DBL test when the activated carbon volume ratio in the sub chamber 14 of the canisters 12 and 13 in FIG. 2 and FIG. 3 is changed. A dashed line in FIG. 4B shows an upper limit of 16 mg of vehicle emission standards in regulations. As shown in FIG. 4B, when the activated carbon volume ratio is more than 7 and equal to or less than 13, a DBL discharge amount can be 16 mg or less.

Accordingly, by setting the activated carbon volume ratio to more than 7 and equal to or less than 10 in consideration of both of the ventilation resistance and the DBL discharge amount, it is possible to limit release of absorbed substances from the atmosphere port 2C, while reducing the ventilation resistance.

Figure 5:
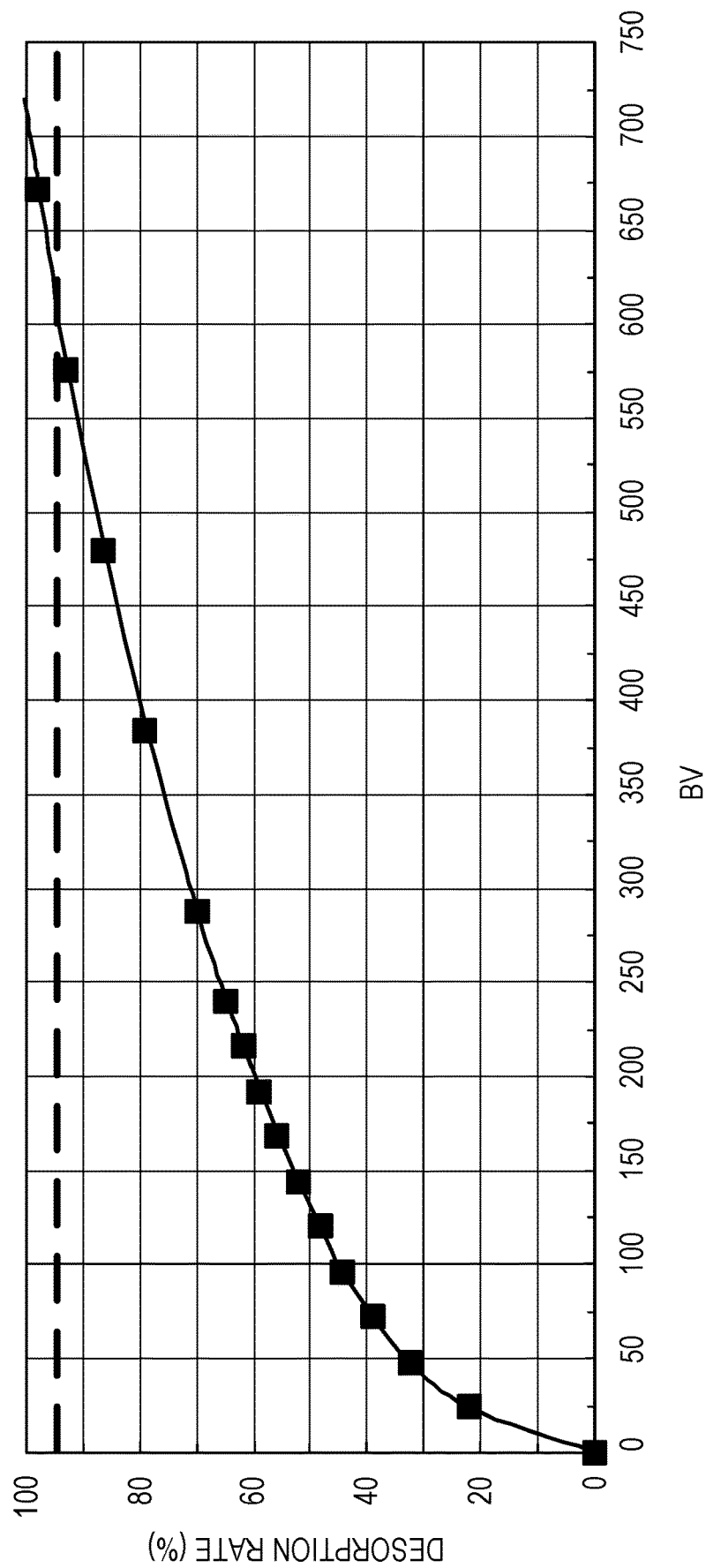
FIG. 5 is a graph showing a relationship between a purge amount and a desorption rate of absorbed substances in the example.

A graph in FIG. 5 shows changes in butane desorption rate inside the sub chamber 4 after purging when the BV in the sub chamber 4 is changed in the canister 1 of FIG. 1A. A dashed line in FIG. 5 shows a desorption rate of 95%.

As shown in FIG. 5, when the BV is 600 or more, the desorption rate can be 95% or more.

What is claimed is:

1. A canister comprising:
a charge port configured to take in an evaporated fuel;
a purge port configured to discharge the evaporated fuel;
an atmosphere port open to atmosphere;
a main chamber to which the charge port and the purge port are connected;
a sub chamber communicating with the main chamber, the atmosphere port being connected to the sub chamber directly or via an additional chamber;
activated carbon stored in a main volume (Vmain) in the main chamber;
additional activated carbon stored in a sub volume (Vsub) in the sub chamber;
a third chamber communicating with the sub chamber, the atmosphere port being connected to the third chamber; and
a first activated carbon and a second activated carbon which are arranged inside the third chamber,
wherein a ratio L/D of a length L in a gas flow direction to an equivalent diameter D in a section perpendicular to the gas flow direction is 2 or more for the sub chamber,
a ratio of the main volume to the sub volume (Vmain/Vsub) is more than 7 and equal to or less than 10, and
the first activated carbon is stored in an area of the third chamber closer to the sub chamber than the second activated carbon, and the first activated carbon has a higher absorption capacity than the second activated carbon.

2. The canister according to claim 1,
wherein a ratio of a volume of purge air (Vpurge) to a volume of the activated carbon stored in the sub chamber (Vsub) is 600 or more.

3. A canister comprising:
a charge port configured to take in an evaporated fuel;
a purge port configured to discharge the evaporated fuel;
an atmosphere port open to atmosphere;
a main chamber to which the charge port and the purge port are connected;
a sub chamber consecutively arranged to receive evaporated fuel from the main chamber, the atmosphere port being connected to the sub chamber directly or via an additional chamber;
activated carbon stored in a main volume (Vmain) in the main chamber;
additional activated carbon stored in a sub volume (Vsub) in the sub chamber;
a third chamber consecutively arranged to receive evaporated fuel from the sub chamber, the atmosphere port being connected to the third chamber; and
a molded activated carbon arranged inside the third chamber;
wherein a ratio L/D of a length L in a gas flow direction to an equivalent diameter D in a section perpendicular to the gas flow direction is 2 or more for the sub chamber,
a ratio of the main volume to the sub volume (Vmain/sub) is more than 7 and equal to or less than 10,
the molded activated carbon has a honeycomb shape, and
a volume of the molded activated carbon (Vhoney) stored in the third chamber is smaller than a volume of the additional activated carbon stored in the sub chamber.

4. The canister according to claim 3, further comprising a resin plate arranged to separate the third chamber and the sub chamber, wherein the molded activated carbon is apart from the resin place.

5. The canister according to claim 3, further comprising a filter arranged between the third chamber and the atmosphere port, wherein the molded activated carbon abuts the filter.

* * * * *